(12) United States Patent
Ehrhart

(10) Patent No.: US 6,979,917 B2
(45) Date of Patent: Dec. 27, 2005

(54) PERMANENT-MAGNETICALLY EXCITED ELECTRICAL MOTOR

(75) Inventor: Peter Ehrhart, München (DE)

(73) Assignee: Magnet-Motor Gesellschaft fur Magnetmotorische Technik mbH, Starnberg (DE)

( * ) Notice: Subject to any disclaimer, the term of this patent is extended or adjusted under 35 U.S.C. 154(b) by 0 days.

(21) Appl. No.: 10/500,402

(22) PCT Filed: Dec. 27, 2002

(86) PCT No.: PCT/EP02/14779

§ 371 (c)(1),
(2), (4) Date: Feb. 3, 2005

(87) PCT Pub. No.: WO03/056685

PCT Pub. Date: Jul. 10, 2003

(65) Prior Publication Data

US 2005/0121983 A1    Jun. 9, 2005

(30) Foreign Application Priority Data

Dec. 28, 2001 (DE) .............................. 101 64 290

(51) Int. Cl.⁷ .............................................. H02K 1/00
(52) U.S. Cl. .................. 310/11; 310/254; 310/261; 310/152
(58) Field of Search ............ 310/11, 152, 154.01, 310/154.34, 156.01, 156.07, 261, 254

(56) References Cited

U.S. PATENT DOCUMENTS 4,398,108 A * 8/1983 Danilevich et al. ........... 310/54
5,486,728 A * 1/1996 Hirama ................. 310/40 MM

FOREIGN PATENT DOCUMENTS

| BE | 379 475 A | 5/1931 |
| DE | 199 59 729 A1 | 7/2001 |
| JP | 01295657 A | * 11/1989 |
| JP | 05122904 A | * 5/1993 |
| JP | 07231611 A | * 8/1995 |

OTHER PUBLICATIONS

Patent Abstracts of Japan, vol. 017, No. 494 (E-1428), Sep. 7, 1993.
Patent Abstracts of Japan, vol. 012, No. 030 (E-578), Jan. 28, 1988.

* cited by examiner

Primary Examiner—Burton Mullins
(74) Attorney, Agent, or Firm—Robert Kinberg; Venable LLP

(57) ABSTRACT

A permanent-magnetically excited electric machine comprising a stator part (2) and a moving part (30) movable relative to the stator part (2), as well as an air gap (8) between the stator part (2) and the moving part (30), with one of said stator part (2) and said moving part (30) having a flux path assembly for magnetic flux and winding coils (6) and the other one of said stator part (2) and said moving part (30) having a flux path assembly for magnetic flux and permanent magnets (36), characterized in that there is provided a flux conduction liquid (18) that is conductive for magnetic flux; and that in the region of the flux path assembly of the stator part (2) and/or of the moving part (30), there is provided at least one filling space (12; 16; 20; 38; 46; 48; 50) which, for changing the magnetic flux conductivity of the flux path assembly, may have optionally more or less flux conduction liquid supplied (18) thereto.

15 Claims, 3 Drawing Sheets

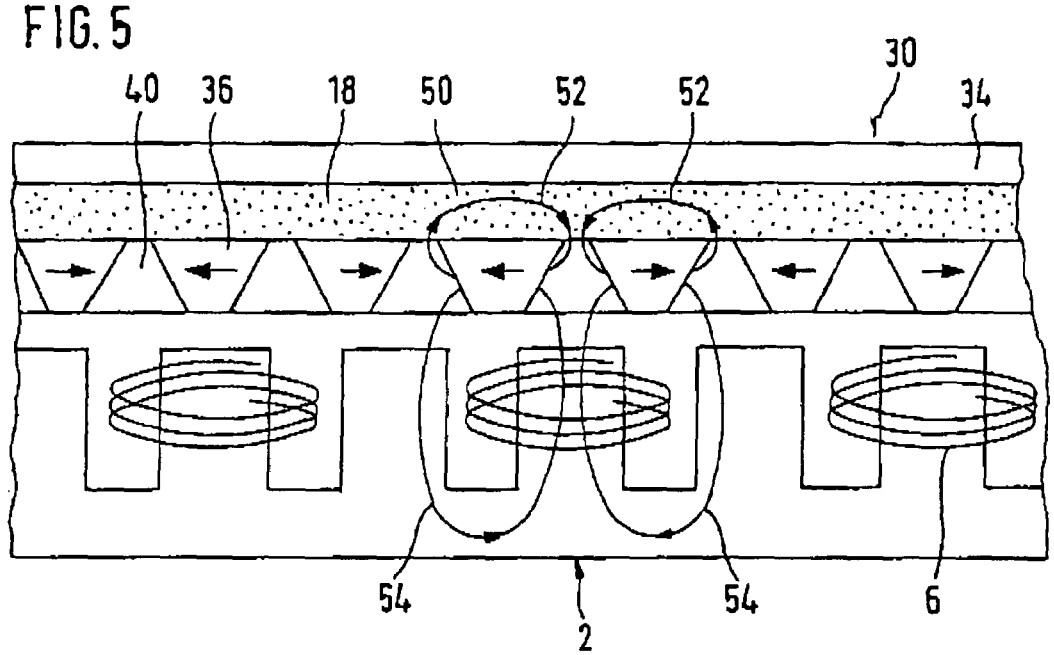
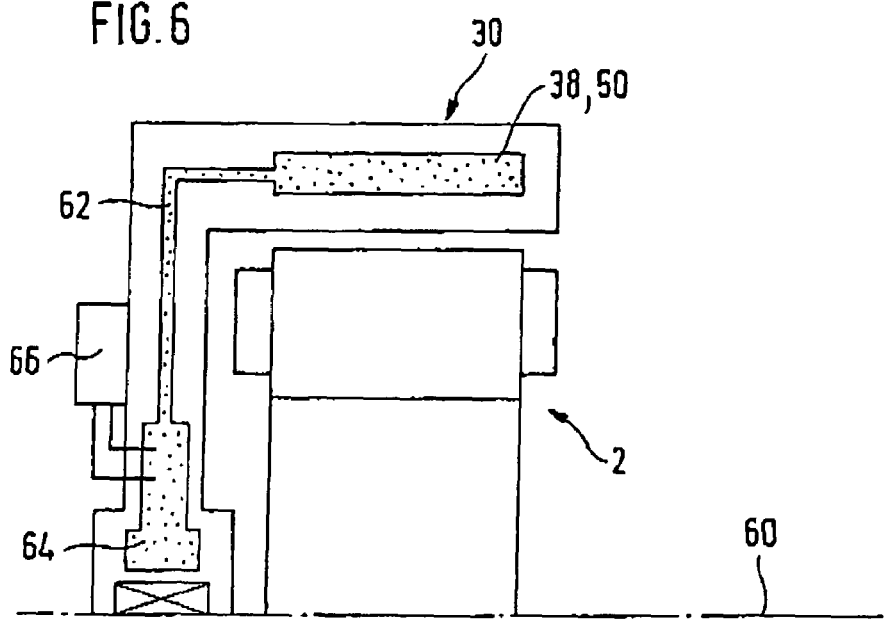

PERMANENT-MAGNETICALLY EXCITED ELECTRICAL MOTOR

The invention relates to a permanent-magnetically excited electric machine comprising a stator part and a moving part movable relative to the stator part, as well as an air gap between the stator part and the moving part, with one of said stator and moving parts having a flux path assembly for magnetic flux and winding coils and the other one of said stator and moving parts having a flux path assembly for magnetic flux and permanent magnets.

The electric machine according to the invention may be an electric motor or a generator for generating current, or also a combination of both thereof operating optionally either as motor or as generator. In the following, reference will be made mainly to electric motors, but all statements apply analogously to generators as well.

The electric machine according to the invention may be a rotary or a linear machine. In the following, reference will be made mainly to rotary electric machines ("rotor part" instead of "moving part"), but all statements apply analogously to linear machines as well.

The electric machine according to the invention preferably is electronically commutated, i.e. it has electronic components by means of which current can be supplied to the winding coils for a respective suitable time phase (electric motor) or by means of which current can be withdrawn from the winding coils at the respective suitable time phases. In the following, reference will be made mainly to electronically commutated machines, but many statements apply analogously also to machines that are not electronically commutated.

In the electric machine according to the invention, there are the following two basic possibilities of design: either the stator part is provided with the winding coils and the moving part is provided with the permanent magnets; this design provides the advantage that no current has to be be supplied to the moving part for the winding coils or withdrawn from the winding coils, respectively. To the contrary, it is also possible to provide the stator part with the permanent magnets and the moving part with the winding coils.

In case of permanent-magnetically excited rotary electric motors, electrical current is supplied to the winding coils each time for "correct" time phases and each time with the "correct" sign. However, as soon as the rotor rotates, the permanent magnets (positioned e.g. on the rotor) induce a voltage in the winding coils (positioned e.g. on the stator); this induced voltage normally is briefly referred to as EMF. In principle, the EMF linearly increases with the speed of the rotor. This is due to the fact that the amplitude and the position-dependent path of the permanent-magnetic flux passing through the winding coils is constant, whereas the speed of change thereof in terms of time changes so with the speed of rotation. A considerable improvement of the overall system consisting of machine and associated power electronics, however, would result if it were possible to take influence on the induced voltage at a given speed, in particular to reduce the increase towards high speeds and to realize in the ideal case a constant voltage over the entire speed range.

There have already been made attempts for taking influence on the amount of the voltage induced in the winding coils. There are known measures using mechanical means, e.g. splitting the stator into two relatively rotatable stator parts, with the associated coils thereof being connected in series; splitting the rotor part into two relatively rotatable rotor parts; axial displacement of the rotor in relation to the stator. Moreover, there are known electrical measures, e.g. series connection of two associated stator coils by means of electric phase shifter; active displacement of the phase angle between current and induced voltage by changing the time of commutation in the associated power electronics (exploitation of the inductive voltage drop); changing of the series/parallel connection of winding coils.

Most of the known measures are very complex and lead to partial results only at the expense of disadvantages in other aspects.

For solving the technical problem mentioned, the permanent-magnetically excited electric machine according to the invention is characterized in that there is provided a flux conduction liquid that is conductive for magnetic flux; and that in the region of the flux path assembly of the stator part and/or of the moving part, there is provided at least one filling space which, for changing the magnetic flux conductivity of the flux path assembly, may have optionally more or less flux conduction liquid supplied thereto.

In the simplest case, the flux conduction liquid is a liquid that is loaded with magnetically conductive particles, e.g. iron powder material, with chemical additives being provided to keep the conductive particles floating so that a permanently stable flux conduction liquid is provided. Flux conduction liquids are known per se and commercially available, e.g. from the company Ferrofluidics GmbH, Nürtingen, Germany.

When the quantity of flux conduction liquid in the filling space is reduced, the magnetic flux conductivity is reduced therein. As a consequence, the amplitude of the magnetic flux through the winding coils is reduced, thereby decreasing the voltage induced there. In most of the practical applications, the quantity of so flux conduction liquid in the filling space will thus be reduced at high speeds of the machines and increased at low speeds thereof.

Preferably, supplying of more or less flux conduction liquid to the filling space comprises the utilization of a number, preferably a small number, of discrete filling states of the filling space, preferably at least the filling state "full" and the filling state "empty". In practical application, the use of only the two filling states "full" and "empty" often is particularly preferred. With this embodiment, the means for changing the filling state can be formed in technically particularly simple manner. It is true that there is no optimum matching in the middle speed range, but at least in the especially important range of high speeds there is achieved a full reduction of the induced EMF according to design.

As an alternative, it is preferred that the supplying of more or less flux conduction liquid to the filling space comprises the utilization of a continuous range of filling states of the filling space, preferably inclusive of the final filling state "full" and the final filling state "empty". This design permits fine matching of the magnetic flux conductivity of the flux path assembly to the speed of the machine, however at the expense of higher expenditure for the technical realization. The term "continuously" is not supposed to mean that any arbitrary filling state is actually utilized. It is merely supposed to point out that a relatively large number of filling states that are relatively close together is employed.

The flux path assembly provided with winding coils preferably is provided with interruptions of the flux path assembly that serve as filling spaces. In case of empty filling spaces, there is the maximum reduction of magnetic flux conductivity of the flux path assembly.

In the flux path assembly provided with winding coils, there are preferably provided local recesses of the magnetic flux cross-sectional area that serve as filling spaces. This design often can be realized in technically simpler manner than the design described in the preceding paragraph. With a suitable size of the recesses (i.e. depth or width, measured transversely to the longitudinal direction of the flux path there, or width, measured in the longitudinal direction of the flux path there), it is easily possible to obtain the desired reductions in magnetic flux conductivity of the flux path assembly.

The flux path assembly provided with winding coils preferably is provided with an under-dimensioned solid-material flux path assembly and at least one filling space for large-area up-dimensioning of the flux path assembly. As a concrete design in this respect, the possibility is to be indicated as an example that the magnetic flux cross-sectional area of iron can be increased considerably with respect to the overall magnetic flux cross-sectional area by an adjacent filling space parallel thereto (when filled with flux conduction liquid), or not (when not filled with flux conduction liquid). The term "large-area" is to point out that the magnetic flux conduction liquid can not only be changed locally at some isolated locations only (as in case of the afore-mentioned interruptions or recesses), but that this change covers either the entire flux path assembly or at least a considerable partial section of the flux path assembly.

Instead of the flux path assembly provided with winding coils, or in addition to said assembly, the inventive variability of the magnetic flux conduction liquid may be established at the flux path assembly provided with permanent magnets (preferably provided on the moving or rotor part).

The flux path assembly provided with permanent magnets preferably is provided with interruptions of the flux path assembly that serve as filling spaces. In case of circumferentially magnetized permanent magnets and flux conduction elements between two adjacent permanent magnets each, this preferably may have the result that distance spaces between permanent magnets and flux conduction elements are provided as filling spaces.

In the flux path assembly provided with permanent magnets, there are preferably provided local recesses of the magnetic flux cross-sectional area that serve as filling spaces.

The flux path assembly provided with permanent magnets preferably is provided with an under-dimensioned solid-material flux path assembly and at least one filling space for large-area up-dimensioning of the flux path assembly.

The statements made hereinbefore with respect to preferred embodiments of the flux path assembly provided with winding coils, apply analogously here for the flux path assemblies provided with permanent magnets as well.

In case of circumferentially magnetized permanent magnets and flux conduction elements between two adjacent permanent magnets each, there is furthermore a preferred design in which there is provided at least one filling space for optionally creating a magnetic shunt on the side of the permanent magnets and the flux conduction elements directed away from the air gap. The magnetic shunt causes a different operating point of the permanent magnets with a different distribution of the magnetic fluxes, which has the effect of a lower air gap field strength. As a result, there is again obtained a decrease of the voltage induced in the winding coils, however in this case with an increase of the flux conduction liquid in the filling space.

A technically particularly uncomplicated design often results if—as is preferred—the filling space is connected to a circuit of the flux conduction liquid. With this design, the air present in the filling space, upon increasing the flux conduction liquid in the filling space, may easily be expelled from this filling space. Upon reduction of the filling state of the filling space, the possibility is present to provide for a renewed flow of air into the filling space.

When the moving part has at least one filling space, it is preferred that a pump for conveying the flux conduction liquid is arranged on or integrated in the moving part. As an alternative, the pump for conveying the flux conduction liquid may be arranged separately from the moving part and connected to the filling space via at least one passageway permitting relative movement. The possibility mentioned first as a rule is mechanically simpler, but increases the weight and the volume of the moving part. The flux conduction system in general comprises a reservoir from which liquid is withdrawn in increasing the quantity of the liquid in the filling space and into which liquid is returned in reducing the liquid quantity in the filling space.

It is preferred to perform the increase or reduction of the quantity of flux conduction liquid in the filling space in automated manner, e.g. in the manner of a control loop as a function of the rotational speed of the machine. In this regard, it will not be very expedient as a rule to react on any small change in speed immediately with a change of the liquid quantity in the filling space. As a rule, it is sufficient to react when the speed has changed by a considerable value and/or stably for a longer period of time.

In case of a machine with an external rotor, in which the flux conduction liquid serves to provide a magnetic shunt, it is possible to take advantage of the automatic filling of the filling space with flux conduction liquid due to centrifugal force, which is effected as a result of a higher speed.

Preferably, the filling space and the flux conduction liquid are at the same time constituent parts of a cooling system of the machine. The cooling system of the machine can operate substantially with the flux conduction liquid only, but combinations with another, liquid or gaseous cooling medium are possible as well. However, the invention provides for the possibility of utilizing a liquid that is present anyway for the function according to the invention, namely the flux conduction liquid, at the same time for cooling purposes as well. In that event, there will preferably be provided an extent of circulation of the flux conduction liquid that is in excess of the extent required for changing the magnetic flux conductivity of the flux path assembly. When the flux conduction liquid at the same time fulfils a cooling function, it has to be cooled down as a rule, e.g. by means of a heat exchanger and a secondary cooling liquid circuit or by means of a heat exchanger to air.

The machine according to the invention, when considering the case of a rotary machine, may be designed either with, an internal rotor or with an external rotor. These two designs are machines with a cylindrical air gap. As an alternative, it is possible to have rotary machines with a planar air gap in which stator part and rotor part are opposite each other in axially spaced apart manner.

The electric machine according to the invention may be constructed in accordance with the flux concentration principle in which a higher magnetic field strength is present in the air gap than at the exit area of the permanent magnets. With respect to more detailed statements concerning the flux concentration principle, reference is made to EP 0 331 180 A. There and further below in the present application, there are also described more concrete embodiments of electric machines according to the flux concentration principle.

The invention and further developments of the invention will be explained in more detail in the following by way of embodiments shown schematically in the drawings in which:

FIG. 5 shows a developed partial region of a cross-sectional area of an electric machine according to another embodiment, illustrating both a stator part and a rotor part;

FIG. 6 shows a highly schematic longitudinal sectional view of part of an electric machine.

Figure 1:
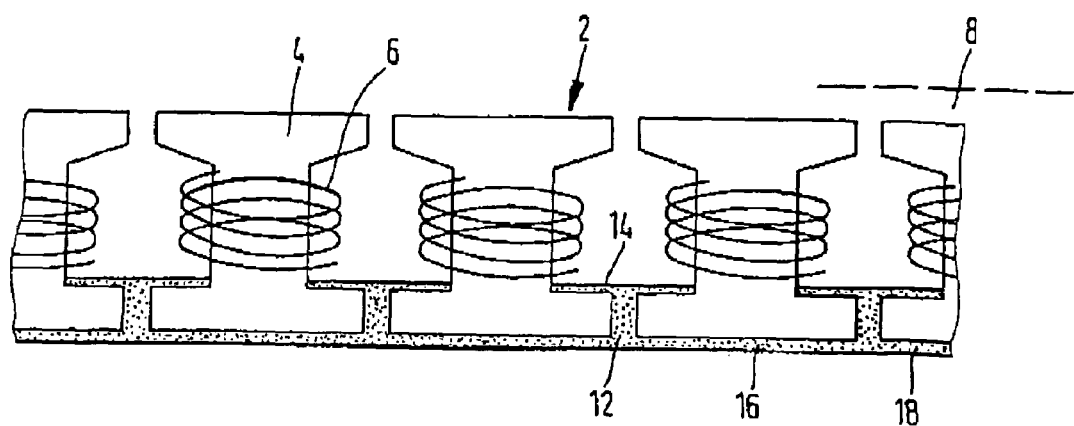
FIG. 1 shows a developed, cross-sectional view of a partial region of a stator part of an electric machine.

The electric machines illustrated in FIGS. 1 to 5 are rotary electric machines in which the stator part has the winding coils and the rotor part has the permanent magnets. This is why the term rotor part, instead of the more general term moving part, is used. Analogous linear machines are conceivable immediately when FIGS. 1 to 5 are not considered as a developed view, but as longitudinal sectional view of a partial region of the linear machine. As will be pointed out more clearly in the description further below, the embodiments according to FIGS. 1 to 5 are all machines with a cylindrical air gap. Considering a different direction of development, the drawing figures may also be understood as machines with a planar air gap. The representations of FIGS. 1 to 5 apply irrespectively of whether an electric motor or a current generator is concerned. In the following description, the term machine will be used, however, it is to be pointed out here that the respective embodiment shown may be optionally either a motor or a generator.

The partial region of a stator part 2 illustrated in FIG. 1 has three stator poles 4 each provided with a winding coil 6. Illustrated by way of a broken line is the location of an air gap 8 of the machine. When the stator part 2 is conceived to have an annular curvature around an axis 10 (which, as indicated by an arrow 10, is located in reality considerably further below with respect to the drawing sheet), the air gap 8 takes a cylindrical configuration; the development carried out for illustration purposes so to speak would be reversed thereby. However, if the axis 10 is conceived to be tilted by 90° in the drawing plane so as to extend from above downwardly, and then displaced from the drawing plane parallel in forward or rearward direction, a cylindrical curvature about this axis leads to a stator in which the free ends of the stator poles 4 constitute a ring lying in a plane and the air gap 8 is a planar air gap.

It can be seen that the stator poles 4, at the side thereof remote from the air gap, do not merge with each other (which would create a conventional magnetic-flux return path there), but that an interruption or break 12 is provided there between two adjacent stator poles 4 each. What has been referred to as flux path assembly (of the stator part) in the preceding description, in the embodiment of FIG. 1, is the lining up of U-shaped iron paths, with an interruption 12 being present in each horizontal leg of the U-shape.

It can be seen that in each interruption 12, the end facing the air gap 8 or the winding groove between two adjacent stator poles 4 is terminated by a sealing wall 14 in liquid-tight manner. The same holds for the end of the interruption 12 located to the rear of the drawing plane and to the end of the interruption 12 located in front of the drawing plane.

All interruptions 12 are connected by a liquid channel 16 extending along the row of stator poles 4 on the side thereof directed away from the air gap. It is pointed out that the liquid channel 16, as measured perpendicularly to the drawing plane, may have substantially the same width as the stator poles 4. In this case, the liquid channel itself constitutes a "filling space" or a "constituent part of the overall filling space" in the sense of the invention. Alternatively, the liquid channel 16, as measured perpendicularly to the drawing plane, may have a relatively small width; in this case, it has in essence just the function of optionally supplying liquid to the interruptions 12 or withdrawing liquid from the interruptions 12. An additional and even particularly preferred alternative consists in providing a liquid channel 16 each both on the face side of the stator poles 4 located in front of the drawing plane and on the other face side of the stator poles 4 located to the rear of the drawing plane. With this design, liquid may be supplied to the interruptions 12 through one of the channels 16, while liquid may be withdrawn from the interruptions 12 through the other one of the two channels 16. The incorporation in a liquid circuit, the discharge of air from the interruptions 12, the renewed feeding of air to the interruptions 12 and other features are possible in particularly simple manner.

The liquid illustrated by way of dots in the interruptions 12 and in channel 16 is a magnetically conductive flux conduction liquid, In the following, the term "flux conduction liquid" will be abbreviated throughout to "liquid" to render the description more concise.

If, as illustrated, the interruptions are filled completely with liquid 18, a state is obtained that is not much different from the situation in which stator iron is contained in the liquid-filled regions (dependent in detail upon the conductivity of the liquid for magnetic flux). If, in contrast thereto, the liquid 18 is withdrawn completely from the interruptions 12 and the channel 16, a state is obtained in which the flux path between each two adjacent stator poles 4 is interrupted, thus creating a very considerable reduction of the EMF induced in the winding coils 6 by the permanent magnets on the moving rotor part. There are possible intermediate values by partly filled interruptions 12. Any interruption 12 constitutes a "filling space" (or in a different consideration, a part of an overall filling space) in the sense of the invention.

Figure 2:
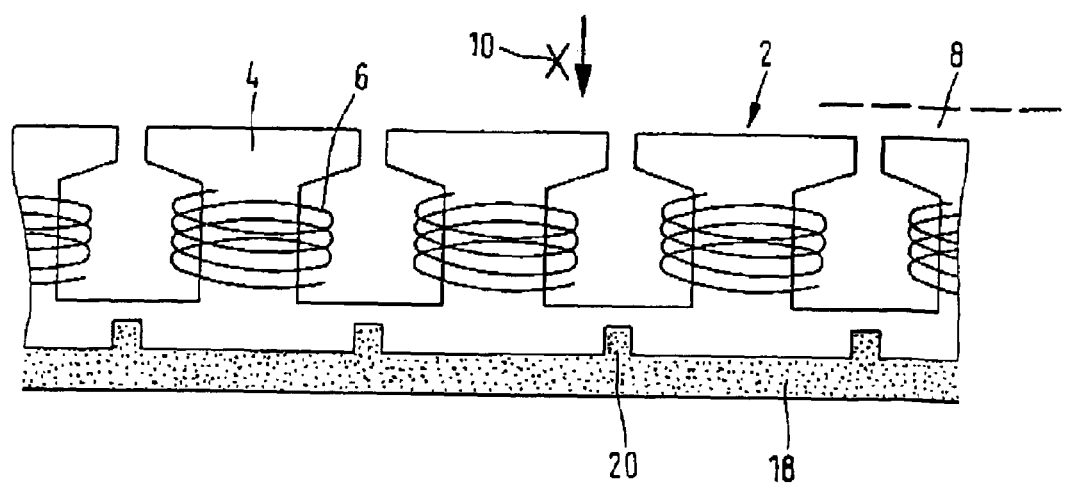
FIG. 2 shows a developed, cross-sectional view of a partial region of a stator of an electric machine according to another embodiment.

The second embodiment according to FIG. 2 differs from the first embodiment according to FIG. 1 merely in that, instead of interruptions 12, there are provided recesses 20 on the side of the flux path assembly directed away from the air gap. The individual stator poles 4 are physically coherent via the stator iron bridging the recesses 20. Sealing as in case of the interruptions 12, by way of the wall 14, is not required. When the recesses 20, for compensation purposes, are made wider (as measured from left to right in FIG. 2 and thus measured in the longitudinal direction of the flux path) than the interruptions 12, a corresponding reduction of the magnetic flux conductivity of the flux path assembly can be achieved.

Figure 3:
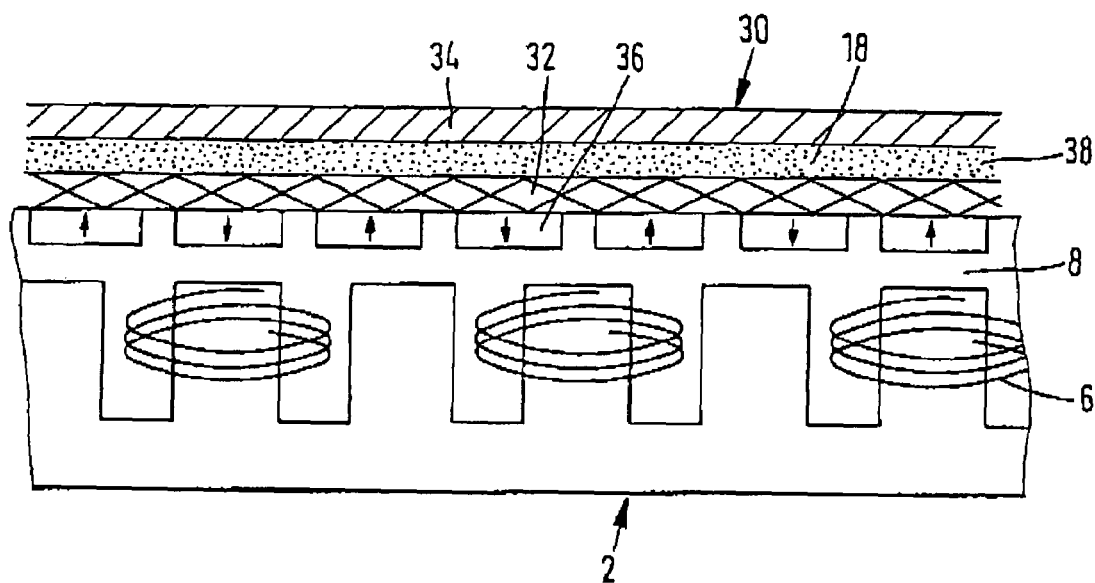
FIG. 3 shows a developed partial region of a cross-sectional area of an electric machine according to another embodiment, illustrating a stator part and a rotor part.

In the third embodiment according to FIG. 3, the variability of the magnetic flux conductivity is provided in the flux path assembly of a rotor part 30. The stator part 2 is formed basically similar to the first and second embodiments, however, it has winding coils 6 on every other stator pole 4 only and there is no pole head broadening and no filling space or spaces for flux conduction liquid at the stator part 2.

The rotor part 30 is substantially cup-shaped (in so far illustrated best by FIG. 6), with the developed-cylindrical partial region illustrated in FIG. 3 consisting in essence of an iron sleeve 32, an outer wall 34 placed therearound while being spaced therefrom, a cylindrical filling space 38 between iron sleeve 32 and wall 34, and permanent magnets 36 mounted to the inside of the iron sleeve 32. When progressing along the row of permanent magnets 36, the polarity thereof alternates. There is in alternating manner a north pole directed to the air gap 8 and a south pole directed to the air gap 8. Circumferentially adjacent permanent magnets 36 are connected magnetically by a magnetic-flux return path, which is provided by the iron sleeve. The iron sleeve 32, provided with the permanent magnets 36, constitutes a flux path assembly of the rotor part 30, In the extreme case, the iron sleeve may be very thin in radial direction and may even be omitted completely.

When the filling space 38 between the iron sleeve 32 and the wall 34 is filled with flux conduction liquid 18, the magnetic flux conductivity of the flux path assembly described is higher than in the event when the filling space 38 contains no liquid 18, since together with the liquid 18 the magnetic flux cross-sectional area of the flux path assembly is effectively increased. The third embodiment makes good sense in case the iron sleeve 32 constitutes an undersized or under-dimensioned flux path assembly that is up-dimensioned by the liquid 18 at low speeds.

It is pointed out that a construction as in case of the third embodiment can also be realized on the stator part. Assume the recesses 20 shown in FIG. 2 to be closed by means of iron, but with the stator iron on the side directed away from the air gap being made so thin in its entirety in radial direction that an under-dimensioning of the flux path assembly is present.

On the other hand, the first embodiment and the second embodiment may also be realized at the rotor part 30. To this end, FIG. 3 should be conceived as having either interruptions in the iron sleeve 32 or recesses radially outside on the iron sleeve 32, between two adjacent permanent magnets 36 each.

Figure 4:
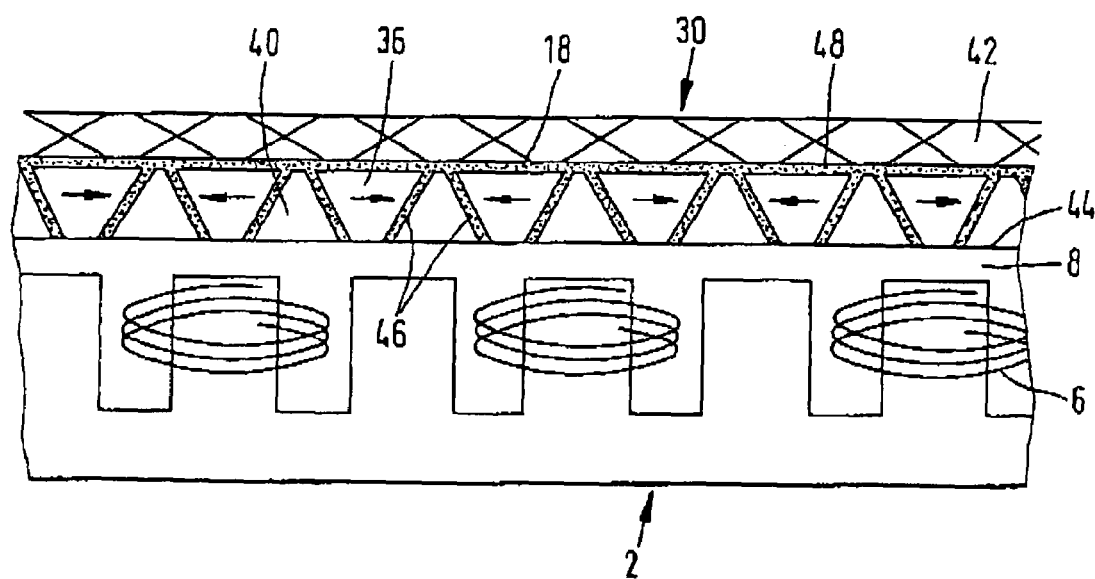
FIG. 4 shows a developed partial region of a cross-sectional area of an electric machine according to another embodiment, illustrating both a stator part and a rotor part.

The fourth embodiment according to FIG. 4 differs from the third embodiment on the one hand in that, instead of the iron sleeve 32 and the radially magnetized permanent magnets 36, an alternating sequence—when moving from left to right in FIG. 4 or in circumferential direction of the machine—of circumferentially magnetized permanent magnets 36 and flux conduction elements 40 is provided. Circumferentially adjacent permanent magnets 36 are magnetized in opposite directions. The permanent magnets 36, in the cross-sectional view of FIG. 4, are of trapezoidal shape having the short base side directed towards the air gap 8. Radially outside of the arrangement of permanent magnets 36 and flux conduction elements 40, there is provided an outer wall 42 supporting the permanent magnets 36 and the flux conduction elements 40. Radially inside, there is provided a sealing wall 44.

Between each permanent magnet 36 and its two circumferentially adjacent flux conduction elements 40 there is provided a spacing gap 46. Radially outside of the arrangement of permanent magnets 36 and flux conduction elements 40, a radially as thin as possible spacing gap 48 is present towards the outer wall 42, that serves merely for transporting the liquid 18. However, preferred is a construction without this spacing gap 48, especially with a supply and discharge of the liquid 18 in axial direction. The spacing gaps 46 together constitute a filling space for flux conduction liquid 18. When the filling space is emptied of liquid 18, the spacing gaps 46 constitute local interruptions of the flux path assembly of the rotor part 30. When the spacing gaps 46 are filled with liquid 18, a flux path assembly with high magnetic flux conductivity is formed.

The fifth embodiment according to FIG. 5 differs from the fourth embodiment in that there is no spacing gap 48 present between each permanent magnet 36 and its two adjacent flux conduction elements 40.The optional spacing gap 48 is expanded to a filling space 50 of large radial thickness.

Due to this modification, the function of the machine is altered. As there are no spacing gaps 46, the flux path assembly of the rotor part 30, also without liquid, is not under-dimensioned. When filling space 50 is filled with liquid 18, magnetic shunts are established between adjacent flux conduction elements 40 via the liquid 18. The operating point of the permanent magnets 36 is thus shifted, providing a different splitting of the fluxes, which has the effect of a lower air gap field strength. As a result, there is established a reduction of the voltage induced in the winding coils 6. The shunts described are illustrated by way of arrow lines 52. Arrow lines 54 indicate the "regular" magnetic circuits via the air gap 8 to the stator part 2 and back again.

FIG. 6 illustrates how a more complete flux conduction liquid system can be conceived e.g. with a filling space configuration as in FIG. 3 or in FIG. 5. The filling space 38 or 50 is connected via a channel 62 to a liquid reservoir 64 (with partial gas volume in reservoir 64). If there is more liquid 18 desired in the filling space 38 or 50, the liquid is supplied there from reservoir 64 via channel 62, and is fed in the opposite way when there is a lesser filling state desired in the filling space. Due to the centrifugal force, the liquid 18 is distributed in the filling space as a radial outer layer. If desired, the filling space 38 or 50 may be filled completely with liquid 18.

It is expedient in practical application to connect an additional liquid channel to the in FIG. 6 right-hand axial face side of the filling space 38 or 50, and to form a circulation system for the liquid 18, preferably by means of a pump. Upon switching of the pump to a different suction opening, it is then possible to pump in liquid or also air e.g. from the left-hand face side in FIG. 6. By pumping liquid 18 in, the filling state of the filling space in increased, whereas by pumping air in, the filling state is reduced. The discharge of liquid or air takes place on the in FIG. 6 right-hand face side of the rotor part 30.

FIG. 6 also is an example to the effect that the flux conduction system, also inclusive of the pump, may be accommodated on the rotor part 30. When the flux conduction liquid system at the same time is to be constituent part of the cooling system of the machine, cooling down of the liquid 18 is expediently provided for, e.g. by a liquid/air heat exchanger 66 on the outside of the rotor part 30.

When the reservoir 64 and the pump, not illustrated, are to be arranged separately from the rotor part 30 and in stationary manner, the channel 62 has to be connected outwardly to the pump and the reservoir 64 e.g. by means of a rotation passage through the axis 60 of rotation.

Furthermore, it is easily conceivable by way of FIG. 6 how a complete flux conduction liquid system for the stator part 2 can be designed. In this event, reservoir 64, pump, channel 62 and optionally heat exchanger 66 are simply provided on the stator part 2 in stationary fashion.

Although in all embodiments the filling spaces were provided either on the stator part 2 or on the rotor part 30, it is emphasized that it is possible to provide the filling spaces both on the stator part 2 and on the rotor part 30.

As a rule, the most important operating states will be "filling space or spaces full" and "filling space or spaces empty". However, it is also possible to employ discrete intermediate filling states or a quasi continuous variation of the filling states. Partly full filling states are conceivable best in rotary machines in practical application when the stator part 2 or the rotor part 30 is circumferentially divided into a plurality of sectors and each sector is provided with a supply channel of its own and, optionally, with a discharge channel of its own. Especially in case of the fourth embodiment, a partial filling state that is circumferentially balanced automatically presents itself due to the rotational movement of the rotor part 30.

In case the machine is a generator, the purpose according to the invention is not a reduction of the induced EMF at high speeds, but the possibility of reducing the speed dependency of the value of the voltage generated.

What is claimed is:

1. A permanent-magnetically excited electric machine comprising a stator part (2) and a moving part (30) movable relative to the stator part (2), as well as an air gap (8) between the stator part (2) and the moving part (30), with one of said stator part (2) and said moving part (30) having a flux path assembly for magnetic flux and winding coils (6) and the other one of said stator part (2) and said moving part (30) having a flux path assembly for magnetic flux and permanent magnets (36), and in which in the region of the flux path assembly of the stator part (2) and/or of the moving part (30), there is provided at least one filling space (12; 16; 20; 38; 46; 48; 50) for receiving flux conduction liquid (18) that is conductive for magnetic flux, characterized in that, for changing the magnetic flux conductivity of the flux path assembly, the quantity of the flux conduction liquid (18) in the filling space (12; 16; 20; 38; 46; 48; 50) may be changed during operation of the machine in dependency on the rotational speed of the machine.

2. A machine according to claim 1, characterized in that supplying of more or less flux conduction liquid (18) to the filling space comprises the utilization of a number of discrete filling states of the filling space, preferably at least the filling state "full" and the filling state "empty".

3. A machine according to claim 1, characterized in that supplying of more or less flux conduction liquid (18) to the filling space comprises the utilization of a continuous range of filling states of the filling space, preferably inclusive of the final filling state "full" and the final filling state "empty".

4. A machine according to claim 1, characterized in that the flux path assembly provided with winding coils (6) is provided with interruptions (12) of the flux path assembly that serve as filling spaces.

5. A machine according to claim 1, characterized in that the flux path assembly provided with winding coils (6) is provided with local recesses (20) of the magnetic flux cross-sectional area that serve as filling spaces.

6. A machine according to claim 1, characterized in that the flux path assembly provided with winding coils (6) is provided with an under-dimensioned solid-material flux path assembly and at least one filling space for large-area up-dimensioning of the flux path assembly.

7. A machine according to claim 1, characterized in that the flux path assembly provided with permanent magnets (36) is provided with interruptions of the flux path assembly that serve as filling spaces.

8. A machine according to claim 7, characterized in that circumferentially magnetized permanent magnets (36) and flux conduction elements (40) are provided between two adjacent permanent magnets (36) each; and that distance spaces (46) between permanent magnets (36) and flux conduction elements (40) are provided as filling spaces.

9. A machine according to claim 1, characterized in that the flux path assembly provided with permanent magnets (36) is provided with local recesses of the magnetic flux cross-sectional area that serve as filling spaces.

10. A machine according to claim 1, characterized in that the flux path assembly provided with permanent magnets (36) is provided with an under-dimension solid-material flux path assembly (32) and at least one filling space (38) for large-area up-dimensioning of the flux path assembly.

11. A machine according to claim 1, characterized in that circumferentially magnetized permanent magnets (36) and flux conduction elements (40) are provided between two adjacent permanent magnets (36) each; and that on the side of the permanent magnets (36) and the flux conduction elements (40) directed away from the air gap, there is provided at least one filling space for optionally providing a magnetic shunt.

12. A machine according to claim 1, characterized in that the filling space is connected to a circuit of the flux conduction liquid (18).

13. A machine according to claim 1, characterized in that the moving part (30) has at least one filling space; and that a pump for conveying the flux conduction liquid (18) is arranged on the moving part (30).

14. A machine according to claim 1, characterized in that the moving part (30) has at least one filling space; and that a pump for conveying the flux conduction liquid (18) is arranged separately from the moving part and is connected to the filling space via at least one passageway permitting relative movement.

15. A machine according to claim 1, characterized in that the filling space and the flux conduction liquid (18) at the same time are constituent part of a cooling system of the machine.

* * * * *